United States Patent
Tsujioka et al.

(10) Patent No.: US 6,197,205 B1
(45) Date of Patent: Mar. 6, 2001

(54) ELECTROLYTIC SOLUTION FOR LITHIUM CELL AND METHOD FOR PRODUCING SAME

(75) Inventors: Shouichi Tsujioka; Mituo Takahata; Hisakazu Itou; Tadayuki Kawashima; Keiji Sato; Hiromi Sasaki; Sunao Yamamoto, all of Ube (JP)

(73) Assignee: Central Glass Company, Limited, Tokyo (JP)

( * ) Notice: Subject to any disclaimer, the term of this patent is extended or adjusted under 35 U.S.C. 154(b) by 0 days.

(21) Appl. No.: 09/572,887

(22) Filed: May 18, 2000

Related U.S. Application Data

(62) Division of application No. 08/766,054, filed on Dec. 16, 1996, now abandoned.

(30) Foreign Application Priority Data

Dec. 14, 1995 (JP) .................................................. 7-325365
Mar. 11, 1996 (JP) .................................................. 8-52816
Sep. 19, 1996 (JP) .................................................. 8-247385

(51) Int. Cl.[7] .............................. C02F 1/76; H01M 6/04; C01B 25/00

(52) U.S. Cl. ................... 210/754; 210/753; 252/182.32; 252/182.35; 429/200; 429/188; 423/301; 423/596

(58) Field of Search ........................ 252/182.32, 182.35, 252/183.14; 429/200, 188; 423/301, 596; 210/753, 754

(56) References Cited

U.S. PATENT DOCUMENTS

| | | | |
|---|---|---|---|
| 3,607,020 | * 9/1971 | Smith | 423/301 |
| 3,907,977 | * 9/1975 | Wiesboeck | 423/464 |
| 4,755,370 | * 7/1988 | Kray et al. | 423/342 |
| 4,803,137 | * 2/1989 | Miyazaki et al. | 252/182.1 |
| 4,880,714 | * 11/1989 | Bowden | 429/197 |
| 5,041,347 | * 8/1991 | Dahn et al. | 252/182.1 |
| 5,247,117 | * 9/1993 | Yamazaki et al. | 556/466 |
| 5,378,445 | * 1/1995 | Salmon et al. | 423/301 |
| 5,458,996 | * 10/1995 | Itoh et al. | 429/196 |
| 6,001,325 | * 12/1999 | Salmon et al. | 423/596 |
| 6,033,808 | * 3/2000 | Salmon et al. | 429/322 |

OTHER PUBLICATIONS

Kemmit et al, "The Structural Chemistry of Complex Fluorides . . . " J. Chem. Soc. Part 4, pp. 4408–4413 (1963).

* cited by examiner

Primary Examiner—Joseph D. Anthony
(74) Attorney, Agent, or Firm—Evenson, McKeown, Edwards & Lenahan, P.L.L.C.

(57) ABSTRACT

The present invention relates to a method for producing an electrolytic solution containing a solute of lithium hexafluorophosphate. This method includes a step of (a) reacting lithium fluoride with phosphorus pentafluiride, in a nonaqueous organic solvent that is used for producing a lithium cell's electrolytic solution, thereby to form the lithium hexafluorophosphate dissolved in the solvent. According to this method, both yield and purity of the reaction product are sufficiently high, and the reaction can easily be managed. According to need, after the step (a), the nonaqueous organic solvent may be replaced with another nonaqueous organic solvent. The present invention further relates to a method for purifying an electrolytic solution used for a lithium cell. This electrolytic solution contains an acid impurity having at least one hydrogen atom in the molecule. this method includes steps of (a) adding at least one hydrogen-free halide selected from chlorides, bromides and iodides, to the electrolytic solution, such that the acid impurity is reacted with the at least one hydrogen-free halide, thereby to form at least one hydrogen halide selected from hydrogen chloride, hydrogen bromide and hydrogen iodide; and (b) purging the at least one hydrogen halide from the electrolytic solution to purify the electrolytic solution. The acid impurity concentration of the electrolytic solution is substantially reduced by this method.

13 Claims, No Drawings

US 6,197,205 B1

ELECTROLYTIC SOLUTION FOR LITHIUM CELL AND METHOD FOR PRODUCING SAME

This application is a division of application Ser. No. 08/766,054, filed Dec. 16, 1996 now abandoned.

BACKGROUND OF THE INVENTION

This invention relates to lithium cell's electrolytic solution containing lithium hexafluorophosphate, and a method for producing the electrolytic solution, and a method for purifying the electrolytic solution.

Hitherto, there have ben proposed various methods for producing lithium hexafluorophophate. For example, Japanese Patent Unexamined Publication JP-A-Sho-A-64-72901 discloses a method in which lithium fluoride which is in the form of solid is reacted with phosphorus pentafluoride which is in the form of gas, without using any solvent. In this method, after the reaction has been started, particles of lithium fluoride are coated with the reaction product (i.e., hexafluorophosphate). With this, the reaction does not proceed further, and thus the unreacted lithium fluoride is left in the reaction system. As another example, J. Chem. Soc. Part 4, 4408 (1963) discloses a method in which lithium fluoride dissolved in anhydrous hydrogen fluoride is reacted with phosphorus pentafluoride which is in the form of gas. It is, however, difficult to handle this reaction, beacause anhydrous hydrogen fluoride, which is high in vapor pressure, is used as a solvent. Furthermore, when the reaction product, lithium hexafluorophosphate, is taken in the form of crystals, an impurity, hydrogen fluoride, remains therein. If this impurity still remains in the electrolytic solution of a sithium cell, it interferes with the operation thereof. As mentioned hereinabove, the conventional methods for producing lithium hexafluorophosphate are not satisfactory in yield of the reaction, easiness to handle the reaction, and/or purity of the reaction product.

Lithium hexafluorophosphate is very stable, when it is ionically dissociated in a nonaqueous solvent. It is, however, very unstable and thus susceptible to hydrolysis and thelike during storage or transportation under a solid condition.

The above-mentioned lithium hexafluorophosphate and other lithium salts of fluorine-containing compounds are commonly used as electrolytes (solutes) dissolved in electrolytica solutions for lithium cells. These electrolytic solutions generally contain various acid impurities such as hydrogen fluoride. Of the electrolytes, lithium hexafluorophosphate and the like are easily decomposed by water contained in the electrolytic solution, thereby to produce acid impurities such as hydrogen fluiride, phosphoric acid, and oxygluorophosphoric acid. If an electrolytic solution containing acid impurities is used in a lithium cell, the acid impurities are reacted with the athode, the anode, and the solvent of teh electrolytic solution, thereby to lower the discharge capacity of the cell, to increase the internal resistance, to shorten lifetime of the cell, and to cause other problems. Hitherto, there have been various proposals for purging acid impurities from the electrolytic solution. For example, there have been proposals for purging water from the electrolytic solution in order to suppress the formation of acid impurities. However, it has been difficult to completely purge water therefrom. Thus, the electrolytic solutions purified by conventional purging methods were unsatisfactory in purity.

SUMMARY OF THE INVENTION

It is an object of the present invention to provide a method for producing an electrolytic solution containing a solute of lithium hexafluorophosphate, which is free of the drawbacks of the above-mentioned conventional methods.

It is a specific object of the present invention to provide such method in which yield of the reaction is high, the reaction can easily be managed, and purity of the reaction product is sufficiently high.

It is another object of the present invention to provide a method for producing an electrolytic solution containing a solute of lithium hexafluorophosphate and a solvent of cyclic carbonic acid ester.

It is still another object of the present invention to provide a method for uprifying an electrolytic solution used for a lithium cell, which method enables the electrolytic solutino to have a substantially low concentration of acid impurities.

According to a first aspect of the present invention, ther is provided a first method for producing an electrolytic solution containing a solute of lithium hexafluorophosphate. The first method comprises a step of (a) reacting lithium fluoride with phosphorus pentafluoride, in a nonaqueous organic solvent that is used for producing a lithium cell's electrolytic solution, thereby to form said lithium hexafluorophosphate dissolved in said solvent. According to the first method, yield of the reaction is high, the reaction can easily be managed, and the reaction product is sufficiently high in purity. By this reaction, lithium hexafluorophosphate is produced, and at the same time it is ionically dissociated. Therefore, the obtained electrolytic solution is very stable and thus is not subjected to hydrolysis and the like during storage or transportation. The electrolytic solution itself obtained by the first method may be used as a lithium cell's electrolytic solution. Alternatively, the lithium hexafluorophosphate may be separated from the solvent, thereby to obtain the same in the form of crystals.

When there is used, as the nonaqueous organic solvent of the first method, a monofunctional chain compound which is stable and thus does not polymerize in the step (a) by the phosphorus pentafluoride, the obtained electrolytic solution itself may be used as a lithium cell's electrolytic solution, as mentioned hereinabove. Even if the monofunctional chain compound is partially decomposed in the step (a) of the first method, the decomposition products, which have smaller molecular weights as compared with that of the monofunctional chain compound, are not polymerized, but are puged from the reaction system in the form of gas. Therefore, this partial decomposition does not have an adverse effect on the electrolytic solution.

As an alternative to the above-mentioned direct use of the electrolytic solution obtained by the first method, another nonaqueous organic solvent, that is, a cyclic carbonic acid ester (e.g., ethylene carbonate and propylene carbonate) and/or the like, which is polymerizable or decomposable in the step (a) by phosphorus pentafluoride acting as a Lewis acid, may be added to the electrolytic solution prepared by the first method. The thus obtained electrolytic solution may also be used as a lithium cell's electrolytic solution. In contrast, in case that only the another nonaqueous organic solvent must be contained in a lithium cell's electrolytic solution, it is not preferable to use the another solvent in the step (a) of the first method, because it may polymerize by lithium pentafluoride, and the thus formed polymer remains in the solution, causing an adverse effect (e.g., the viscosity increase) on the electrolytic solution. In this case, it is preferable that the nonaqueous organic solvent contained in the electrolytic solution prepared by the first method is replaced with the another solvent, after the step (a). This replacement is conducted by steps of(b) adding the another solvent to the electrolytic solution prepared by the first method; and (c) purging only the nonaqueous organic solvent used in the step (a) from the electrolytic solution.

According to the invention, there is provided another method for producing a lithium cell's electrolytic solution containing a solute of lithium hexafluorophosphate, which another method has steps (a) and (b) that are respectively analogous to the above-mentioned steps (b) and (c). In fact, the another method comprises steps of (a) adding a second nonaqueous organic solvent used for a lithium cell, which second solvent is preferably a cyclic carbonic acid ester, to an electrolytic solution containing a solute of lithium hexafluorophosphate dissolved in a first nonaqueous solvent that is preferably a monofunctional chain compoung; and (b) purging only the first nonaqueous solvent from the electrolytic solution.

According to a second aspect of the present invention, there is provided a second method for purifying an electrolytic solution used for a lithium cell. This electrolytic solution contains an acid impurity having at least one hydrogen atom in the molecule. The second method comprises steps of:

(a) adding at least one hydrogen-free halide selected from the group consisting of chlorides, bromides and iodides, to the electrolytic solution, such that the acid impurity is reacted with said at least one hydrogen-free halide, thereby to form at least one hydrogen halide selected from the group consisting of hydrogen chloride, hydrogen bromide and hydrogen iodide; and (b) purging said at least one hydrogen halide from the electrolytic solution to purify the electrolytic solution.

If acid impurities concentration of the electrolytic solution is high, hydrogen ions that are dissolved in the electrolytic solution and are derived from the acid impurities cause problems to a lithium cell, such as deterioration of the electrolytic solution's solvent, the increase of the internal resistance, the decrease of the discharge capacity of the cell, and the shortening of the cell's lifetime. In order to purge these hydrogen ions from the electrolytic solution, the steps (a) and (b) of the second method are conducted. As stated above, at least one of hydrogen chloride, hydrogen bromide and hydrogen iodide is formed by the step (a). Although these hydrogen halides are also classified into acid impurities, these hydrogen halides are high in vapor pressure and are not solvated by common organic solvents used for the electrolytic solution. Therefore, unlike other acid impurities, these hydrogen halides can easily be purged from the electrolytic solution, bny the step (b) of the second method, by distillation and the like, using the vapor pressure difference between hydrogen halides and the solvent of the electrolytic solution. Thus, according to the second method, the above-mentioned hazardous hydrogen ions are purged from an electrolytic solution, thereby to produce an electrolytic solution that is substantially low in acid impurities concentration.

DESCRIPTION OF THE PREFERRED EMBODIMENTS

In accordance with the first aspect of the present invention, the above-mentioned first method for producing an electrolytic solution containing a solute (electrolyte) of lithium hexafluorophosphate will be described in detail, as follows.

The nonaqueous organic solvent used in the first method may be a suitable single nonaqueous organic solvent or a mixture of suitable at least two nonaqueous organic solvents.

The solubility of lithium fluoride (i.e., a raw material of the first method) in this solvent is very small. Therefore, the step (a) of the first method is conducted by bubbling phosphorus pentafluoride (gas) into the solvent, while lithium fluoride is dispersed in the solvent. The reaction product of the steps (a), lithium hexafluorophosphate, has a very high solubility in the solvent. Therefore, lithium hexafluorophosphate does not remain as a coating on the surface of lithium fluoride's particles, but is dissolved in the solvent. Thus, the reaction of the step (a) proceeds completely.

It is preferable that the nonaqueous organic solvent used in the first method is high in chemical stability and provides a high solubility of lithium hexafluorophosphate therein, as mentioned above. Preferable examples of this solvent are cyclic carbonic acid esters such as ethylene carbonate and propylene carbonate; straight carbonic acid esters such as dimethyl carbonate, diethyl cvarbonate and ethylmethyl carbonate; carboxylic esters such as methyl acetate and ethyl acetate; ethers such as 1,2-dimethoxyethane, diethyl ether and isopropionyl ether; and nitriles such as acetonitriles.

The reaction temperature of the step (a) of the first method is in a range preferably from $-40°$ C. to $100°$ C., more preferably from $0°$ C. to $60°$ C. If it is lower than $-40°$ C., the solvent may freeze. With this, the solvent may have a certain color or may increase in viscosity.

In the first method, lithium fluoride is in an amount of preferably not greater than 200 g, more preferably not greater than 100 g, per 1 liter of the solvent. It if is greater than 200 g, the electrolytic solution may be saturated with lithium hexafluorophosphate. With this, lithium fluoride particles may be coated with lithium hexafluorophosphate. The thus coated particles can not react with phosphorus pentafluoride and remain in the electrolytic solution. With this, the electrolytic solution increases in viscosity, and thus it become difficult to separate the lithium fluoride particles from the electrolytic solution by filtration and the like.

In the first method, it suffices to use phosphorus pentafluoride in at least an amount of equimolar with lithium fluoride. If an excessive amount of phosphorus pentafluoride is introduced into the reaction system, it is absorbed by the solvent. Therefore, it must be purged from the electrolytic solution by heating, vacuum, or the like.

In the first method, phosphorus pentafluoride (the raw material) and lithium hexafluorophosphate (the reaction product) are easily hdyrolyzed by moisture. Therefore, it is necessary to conduct the step (a) in a moisture-free atmosphere. In other words, it is preferable to conduct the reaction in a vacuum or in an atmosphere of inert gas.

Lithium hexafluorophosphate of high purity can be separated from the electrolytic solution by cooling or concentration. Alternatively, the electrolytic solution itself obtained by the first method may be used as a lithium cell's electrolytic solution.

As stated above, when the nonaqueous organic solvent contained in the electrolytic solution prepared by the first method is replaced, after the step (a), with another nonaqueous organic solvent, that is, a cyclic carbonic acid ester (e.g., ethylene carbonate and propylene carbonate) and/or the like, which is polymerizable or decomposable in the step (a) by phosphorus pentafluoride acting as a Lewis acid. This replacement is conducted by steps of (b) adding the another solvent to the electrolytic solution prepared by the first method; and (c) purging only the nonaqueous organic solvent used in the step (a). It is preferable to conduct the distillation under reduced pressure, in order to lower the distillation temperature, from the viewpoint of solvent's deterioration and the like. After the purge, according to need, the solute concentration of the electrolytic solution is adjusted to a certain value in order to obtain a lithium cell's electrolytic solution containing lithium hexafluorophosphate.

In accordance with the second aspect of the present invention, the above-mentioned second method for purifying an electrolytic solution used for a lithium cell will be described in detail, as follows.

An electrolytic solution often contains an acid impurity having at least one hydrogen atom in the molecule thereof. This acid impurity is derived from a lithium salt of fluorine-containing compound, which is used as an electrolyte (solute), from other raw materials, and from hydrolysates of an electrolyte.

Examples of an electrolyte contained in an electrolytic solution to be purified by the second method are lithium hexafluorophosphate ($LiPF_6$), which is the most common example, $LiBF_4$, $LiSbF_6$, $LiAsF_6$, $LiCF_3SO_3$, $LiN(CF_8SO_2)_2$, $LiClO_4$, and other lithium salts of strong acids.

A solvent of the electrolytic solution to be purified by the second method is not particularly limited. Examples of this solvent are carbonic acid esters such as ethylene carbonate, propylene carbonate, dimethyl carbonate, dimethyl carbonate, diethyl carbonate, and ethylmethyl carbonate; carboxylic esters such as methyl acetate and ethyl acetate; ethers such as dimethoxyethane, diethyl ether and isopropionyl ether; and nitriles such as acetonitriles.

Examples of an acid impurity to be purged by the second method are acids derived from strong acids used for preparing the solute, such as $HPF_6$, $HBF_4$, $HSbF_6$, $HAsF_6$, $HCF_3SO_3$, $HN(CF_3SO_2)_2$, and $HClO_4$, and other acids formed by, for example, hydrolysis and pyrolysis of the solute, such as HF, $HBOF_2$, $H_2SO_4$, $HSbO_2F_2$, and $HPO_XF_Y$ (e.g., $HPO_2F_2$ and $H_2PO_3F$). The thus exemplified acid impurity is hardly purged by conventional methods. In other words, the acid impurity is low in vapor pressure and is solvated by the solvent. Therefore, according to conventional methods, it is difficult to purge the acid impurity from the electrolytic solution by distillation. Even if th acid impurity is neutralized with a hydroxide or oxide, water is inevitably produced as a by-product of this reaction. This water has an adverse effect on a lithium cell's performance.

Examples of the at least one hydrogen-free halide to be added to the electrolytic solution, in the step (a) of the second method are inorganic chlorides, bromides and iodides, and organic chlorides, bromides and iodides containing active chlorine, bromine and iodine. More concrete examples of this are LiCl, NaCl, $CaCl_2$, $MgCl_2$, KCl, $SiCl_4$, $BCl_3$, $PCl_a$, $PCl_5$, $POCl_3$, $PF_3Cl_2$, $SCl_4$, LiBr, NaBr, $CaBr_2$, $MgBr_2$, KBr, LiI, NaI, $CaI_2$, $MgI_2$, KI, acetyl chloride, oxalyl chloride, and phosgene.

In the second method, if a fluoride were used as the at least one hydrogen-free halide, this fluoride reacts with an acid impurity, so that hydrogen fluoride is formed in the electrolytic solution. This hydrogen fluoride strongly interacts with an organic solvent of the electrolytic solution and thus becomes difficult to be purged therefrom, even by the second method.

As the at least one hydrogen-free halide used in the second method, chlorides are the most preferable by the following reasons. As the first reason, hydrogen chloride, whici formed by reacting at least one hydrogen-free chloride with an acid impurity, has a higher vapor pressure than those of hydrogen bromide and hydrogen iodide. Therefore, hydrogen chloride formed by the step (a) of the second method can easily be purged from the electrolytic solution. As the second reason, hydrogen-free chlorides have smaller solubilities than those of hydrogen-free bromides and iodides. Therefore, the chlorides remain in less amounts in the electrolytic solution, as compared with the bromides and iodides.

In the second method, in case that it is required to prepare a highly-purified electrolytic solution that is not contaminated with elements other than lithium, it is preferable to use at least one lithium halide and more preferable to use lithium chloride, as the at elast one hydrogen-free halide. As an alternative to this, it is preferable to use at least one hydrogen-free halide that has a boiling point not higher than 150° C. An excess amount of this halide can be purged from the electrolytic solution, after the step (b) of the second method. In the preparatino of the above highly-purified electrolytic solution, even if an excess amount of at least one hydrogen-free halide that has a boiling point not lower than 150° C. is purged from the electrolytic solution under reduced pressure, it is necessary to heat the electrolytic solution to a temperature close to the boiling point of the solvent of the electrolytic solution. With this heating, a large amount of the solvent is lost. This is not economical. Furthermore, with this heating, in case that the electrolytic solution contains a reactive electrolyte (e.g., $LiPF_6$, $LiBF_4$, $LiSbF_6$, or $LiAsF_6$), the solvent may be decomposed by this electrolyte.

In the second method, it suffices to use the at least one hydrogen-free halide in at least one amount equimolar with the acid impurity. It is preferable to use this halide in an amount of from 1 to 1.5 moles per mol of the acid impurity, because of that the at least one hydrogen-free halide may become another impurity, and that the reaction of this halide with the acid impurity proceeds quantitatively.

In the second method, the manner of the reaction of the at least one hydrogen-free halide with the acid impurity is not particularly limited. For example, this reaction may be conducted in a batchwise manner in a reaction vessel. Furthermore, if this halide is in the form of solid, the reaction may be conducted continuously by allowing the electrolytic solution containing the acid impurity to flow through a column charged with the halide.

In the second method, at least one hydrogen halide selected from hydrogen chloride, hydrogen bromide and hydrogen iodide is formed in the step (a) by the reaction of the at least one hdyrogen-free halide with the acid mpurity. Then, the at least one hdyrogen halide is purged in the step (b) from the electrolytic solution, using the vapor pressure difference. In other words, the step (b) may be conducted by distillation under reduced pressure, by bubbling of an inert gas into the electrolytic solution, or by other means.

In the second method, the steo (b) is conducted at a temperature preferably from 0 to 150° C., more preferably from 30 to 100° C. If it is lower than 0° C., the purge rate may become impractically slow. If it is higher than 150° C., the solvent's vapor pressure may become too high, and thus a large amount of the solvent may be lost. This is not economical. Furthermore, in case that the electrolytic solution contains a reactive electrolyte (e.g., $LiPF_6$, $LiBF_4$, $LiSbF_6$, or $LiAsF_6$), the solvent may be decomposed by this electrolyte at a temperature higher than 150° C.

In case that the at least one hydrogen-free halide used in the second method is volatile, an excess amount of this halide is also purged from the electrolytic solution in the step (b). In case that this halide is in the form of solid, it is necessary, after the step (a), to separate a solid matter from the electrolytic solution by filtration or the like, in order to purge an excess amount of the hydrogen-free halide and a precipitate of a by-product(s) formed by the reaction of the halide with the acid impurity.

The following nonlimitative Examples 1–5 are illustrative of the first aspect of the present invention.

EXAMPLE 1

In this example, lithium fluoride was reacted with phosphorus pentafluoride in propylene carbonate, as follows.

At first, 5.2 g of lithium fluoride was added to 200 ml of propylene carbonate in a reaction vessel made of Teflon (a trade name of polytetrafluoroethylene), and then this lithium fluoride was dispersed therein. Then, this dispersion liquid was cooled down to and maintained at 20° C. Under this condition, a gas mixture containing 17 vol % phosphorus pentafluoride gas and a remainder of nitrogen gas was bubbled into the dispersion liquid through a gas introduction tube. The reaction was stopped at the time when lithium fluoride dispersed in propylene carbonate disappeared. In this reaction, 26 g of phosphorus pentafluoride was consumed. Propylene carbonate was distilled off from the thus obtained electrolytic solution. With this, 30 g of lithium hexafluorophosphate was obtained, and its yield was 98.7%. The concentration of acid impurities which are an obstacle to the application of the electrolytic solution to lithium cell was 100 ppm.

EXAMPLE 2

In this example, Example 1 was modified, as follows, by using a solvent of 1,2-dimethoxyethane.

At first, a dispersion liquid was prepared in the same manner as that of Example 1, except in that 200 ml of 1,2-dimethoxyethane was used as a solvent. Then, this dispersion liquid was cooled down to and maintained at −20° C. Under this condition, a gas mixture that is the same as that of Example 1 was bubbled into the dispersion liquid in the same manner as that of Example 1. The reaction was stopped at the time when lithium fluoride dispersed in 1,3-dimethoxyethane disappeared. In this reaction, 26 g of phosphorus pentafluoride was consumed. 1,2-dimethoxyethane was distilled off from the thus obtained electrolytic solution. With this, 30 g of lithium hexafluorophosphate was obtained, and its yield was 98.7%. The concentration of acid impurities which are an obstacle to the application of the electrolytic solution to lithium cell was 95 ppm.

EXAMPLE 3

In this example, Example 1 was modified, as follows, by using a solvent mixture of ethylene carbonate and diethyl carbonate.

At first, a dispersion liquid was prepared in the same manner as that of Example 1, except in that a mixture of 100 ml of ethylene carbonate and 100 ml of diethyl carbonate was used as a solvent. Then, this dispersion liquid was cooled down to and maintained at 10° C. Under this condition, a gas mixture containing 50 vol % phosphorus pentafluoride gas and a remainder of nitrogen gas was bubbled into the dispersion liquid through a gas introduction tube. The reaction was stopped at the tiem whe lithium fluoride dispersed in the solvent disappeared. In this reaction, 26 g of phosphorus pentafluoride was consumed. The obtained electrolytic solution was heated to 50° C., and an excess amount of phosphorus pentafluoride was purged from the solution, by degassing with a vacuum pump. The formation of lithium hexafluorophosphate in the electrolytic solution was confirmed by using $F^{19}$-NMR and ion chromatograph. The acid impurities concentration of the electrolytic solution was 10 ppm, and the amount of the acid impurities, based on the total weight of lithium hexafluorophosphate, was 70 ppm. The ionic conductivity of the electrolytic solution was 7.8 mS/cm. This value was substantially similar to that of another solution prepared by dissolving lithium hexafluorophosphate in the same amount as that of the above electrolytic solution into a mixture of 100 ml of ethylene carbonate and 100 ml of diethyl carbonate. In other words, the another solution did not contain any acid impurities.

A test cell was prepared by using the above electrolytic solution, as follows. At first, 95 parts by weight of a natural graphite powder was mixed with 5 parts by weight of a polyvinylidene fluoride (PVDF) used as a binder. To this mixture N,N-dimethylformamide was added, to prepare a slurry. This slurry was applied to a nickel mesh, and the thus coated nickel mesh was dried at 150° C. for 12 hr, thereby to prepare a cathode of the test cell. Separately, 85 parts by weight of lithium cobalt oxide was mixed with 10 parts by weight of a natural graphite powder and 5 parts by weight of the PVDF. To this mixture N,N-dimethylformamide was added, to prepare a slurry. This slurry was applied to a piece of aluminum foil, and then this foil was dried at 150° C. for 12 hr, thereby to prepare an anode of the test cell. A test cell was made by using the above electrolytic solution, cathode and anode and a separator made of polypropylene nonwoven fabric.

The thus prepared test cell was subjected to a charge-and-discharge test under a constant current, as follows. In this test, the discharge capacity change was examined by alternately repeating 100 cycles of a charge of the cell until 4.2 V and a discharge of the cell until 2.5 V, under a current density of 0.35 mA/cm$^2$. By this test, it was found that the efficiency of the charge-and-discharge was almost 100%, and that the discharge capacity did not change at all.

COMPARATIVE EXAMPLE 1

In this comparative example, lithium fluoride was reacted with phosphorus pentafluoride without using any solvent.

At first, 5.2 g of lithium fluoride was introduced into a reaction vessel that is made of nickel and is equipped with a stirrer, and then the reaction vessel was evacuated. After that, a 100% phosphorus pentafluoride gas was introduced into the reaction vessel, to conduct the reaction at 100° C. The gas flow was stopped at the end of the reaction when the phosphorus pentafluoride absorption by lithium fluoride has stopped. Although an excessive amount of phosphorus pentafluoride was introduced, a part of lithium fluoride remained unreacted. The yield of lithium hexafluorophosphate was 55%.

COMPARATIVE EXAMPLE 2

In this comparative example, lithium fluoride was reacted with phosphorus pentafluoride, using a solvent not according to the invention.

At first, 32 g of lithium fluoride was dissolved in 500 g of anhydrous hydrogen fluoride. Then, 150 g of phosphorus pentafluoride was bubbled into this solution, to allow the reaction with lithium fluoride. The obtained reaction solution was slowly cooled down to −20° C. by spending one night, thereby form a precipitation of lithium hexafluorophosphate crystals. The crystals were separated from the solution by filtration, and then hydrogen fluoride was removed form the crystals under reduced pressure at room temperature. With this, there was obtained 65 g of lithium hexafluorophosphate crystals having a diameter of about 1 mm. The acid impurities concentration thereof was 300 ppm.

In each of the following Examples 4–5, lithium fluorode was reacted with phosphorus pentafluoride in a nonaqueous organic solvent that is a monofunctional chain compound to prepare an electrolytic solution, and then this solvent was replaced with another nonaqueous organic solvent that is a cyclic carbonic acid ester.

EXAMPLE 4

At first, 5.2 g of lithium fluoride was added to 200 ml of diethyl carbonate in a reaction vessel made of Teflon, and then this lithium fluoride was dispersed therein. Then, this dispersion liquid was cooled down to and maintained at 0° C. Under this condition, a gas mixture containing 17 vol % phosphorus pentafluoride gas and a remainder of nitrogen gas was bubbled into the dispersion liquid through a gas introduction tube. The reaction was stopped at the time when lithium fluoride dispersed in diethyl carbonate disappeared. In this reactino, 26 g of phosphorus pentafluoride was consumed. The obtained solution was heated to 40° C., and at this temperature the unreacted phosphorus pentafluoride was purged from the solution under reduced pressure. Then, 200 ml of propylene carbonate was added to the solution, followed by a sufficient stirring. Then, under a pressure of about 1 torr, diethyl carbonate was distilled off from the solution at 36° C. This distillation was continued until the boiling of diethyl carbonate terminated. The thus obtained electrolytic solution was colorless, and it was found that this solution did not contain the solvent's decomposition products and the like, from the analytical results obtained by using infrared spectroscopy, nuclear magnetic resonance (NMR), gas chromatography, and the like. It was confirmed by $F^{19}$-NMR and ion chromatography that lithium hexafluorophosphate was formed in the solvent. There was obtained 30 g of lithium hexafluorophosphate by evaporating the solvent, and its yield was 98.7%. The concentration of acid impurities which are an obstacle to the application of the electrolytic solution to lithium cell was 10 ppm.

EXAMPLE 5

At first, a dispersion liquid was prepared in the same manner as that of Example 4, except that 200 ml of dimethyl carbonate was used in place of diethyl carbonate. Then, this dispersion liquid was cooled down to and maintained at 20° C. Under this condition, a bubbling was conducted in a manner that is the same as that of Example 4. The reaction was stopped at the tiem when lithium fluoride dispersed in dimethyl carbonate disappeared. In this reaction, 26 g of phosphorus pentafluoride was consumed. The unreacted phosphorus pentafluoride was purged from the solution in the same manner as that of Example 4. Then, 100 ml of ethylene carbonate was added to the solution, followed by a sufficient stirring. Then, udner a pressure of about 1 torr, dimethyl carbonate was distilled off from the solution. The thus obtained electrolytic solution had characteristics that are the same as those mentioned in Example 4. There was obtained 30 g of lithium hexafluorophosphate by evaporating the solvent, and its yield was 98.7%. The concentration of acid impurities which are an obstacle to the application of the electrolytic solution to lithium cell was 14 ppm.

Then, 100 ml of diethyl carbonate was added to the thus prepared solution in order to prepare an electrolytic solution containing a solute of 1M (molarity) lithium hexafluorophosphate dissolved in a solvent mixture of ethylene carbonate and diethyl carbonate. This solution is commonly used as an electrolytic solution of lithium secondary cell. The prepared electrolytic solution had an ionic conductivity of 7.8 mS/cm, and this value was substantially the same as that of another electrolytic solution made by dissolving 30 g of lithium hexafluorophosphate (solid) in a solvent mixture of 100 ml of ethylene carbonate and 100 ml of diethyl carbonate.

A test cell was prepared in a manner that is the same as that of Example 3, except in that the above-prepared electrolytic solution of this example was used in place of that of Example 3. The thus prepared test cell was subjected to the same charge-and-discharge test as that of Example 3. The results of this test were also satisfactory, as is the same as those of Example 3.

COMPARATIVE EXAMPLE 3

In this comparative example, 65 g of lithium hexafluorophosphate obtained in Comparative Example 2 was dissolved in 200 ml of propylene carbonate. The acid impurities concentration of this solution was 35 ppm.

COMPARATIVE EXAMPLE 4

At first, 5.2 g of lithium fluoride was added to 200 ml of propylene carboante in a reaction vessel made of Teflon, and this lithium fluoride was dispersed therein. Then, this dispersion liquid was cooled down to 0° C. Then, a bubbling was conducted in the same manner as that of Example 1, except that the dispersion liquid was maintained at 0° C. After the start of this bubbling, the dispersion liquid turned brown, and its viscosity increased, although lithium hexafluorophosphate was continuously formed during the bubbling.

The following nonlimitative Examples 6–13 are illustrative of the second aspect of the present invention.

EXAMPLE 6

In ths example, lithium chloride was added to an electrolytic solution containing hydrogen fluoride, and then nitrogen gas was bubbled into the solution, as follows.

At first, 152 g (1 mol) of lithium hexafluorophosphate (LiPF$_6$) was dissolved into a solvent mixture of 1 part by volume of diethyl carbonate and 1 part by volume of ethylene carbonate, in a glove box adjusted to have a dew point of −60° C., to prepare 1,000 ml of an electrolytic solution. This solution was found to have 100 ppm of hydrogen fluoride (acid impurity) by analyses with titration and ion chromatography. Then, 0.3 g of lithium chloride was added to the electrolytic solution, followed by stirring for 12 hr at room temperature. Then, the electrolytic solution was put into a PTFE vessel equipped with a nozzle for bubbling nitrogen gas thereinto, and then nitrogen gas was bubbled into the solution at 50° C. for 4 hr. The sampled waste gas emitted from the solution was found to contain hydrochloric acid and diethyl carbonate, by an analysis with infrared spectrometer. Then, diethyl carbonate in an amount comparable to that of the same lost in the nitrogen gas bubbling was added tothe electrolytic solution, and then a precipitate of lithium fluoride formed by the reaction of lithium chloride with hydrogen fluoride was separated from the electrolytic solution by filtration. This solution was found to havea hydrogen fluoride concentration less than the minimum limit (10 ppm) of determination.

The ionic conductivity of teh thus obtained electrolytic solution containing $LiPF_6$ (its concentration is 1 mol/liter) dissolved in a solvent mixture of 1 part by volume of diethyl carbonate and 1 part by volume of ethylene carbonate was measured at 25° C. using an alternating current double-pole type conductometer. The result of this measurement was 7.8 mS/cm, which is comparable to that of another electrolytic solution formed by simply dissolving $LiPF_6$ into a solvent mixture of ethylene carbonate and diethyl carbonate. The above electrolytic solution was found to have no decomposition products by analyses with infrared spectroscopy, NMR, gas chromatography, and liquid chromatography.

A test cell was prepared in a manner that is the same as that of Example 3, except in that the above-prepared electrolytic solution of this example was used in place of that of Example 3. The thus prepared test cell was subjected to the same charge-and-discharge test as that of Example 3, except in that the discharge capacity change was examined by alternately repeating 500 cycles of the charge and the discharge. The results of this test were also satisfactory, as is the same as those of Example 3. This test cell was stored for 3 months at 60° C. for conducting an accelerated deterioration test. After the deterioration test, the above charge-and-discharge test was conducted again in the same manner as above. By this test, it was found that the initial discharge capacity (100%) decreased to about 96%. After this test, there was observed no alteration to the electrolytic solution of the test cell, and thus this solution was kept colorless.

EXAMPLE 7

At first, 304 g (2 moles) of $LiPF_6$ was dissolved into propylene carbonate, in a glove box adjusted to have a dew point of −60° C., to prepare 1,000 ml of an electrolytic solution. This solution was found to have 130 ppm of hydrogen fluoride (acid impurity) by an analysis with titration. Then, 0.7 g of lithium bromide was added to the electrolytic solution, followed by stirring for 12 hr at room temperature. Then, the electrolytic solution was degassed at 60° C. under a pressure of 10 torr for 7 hr. Then, a precipitate of lithium fluoride formed by the reaction of lithium bromide with hydrogen fluoride was separated from the electrolytic solution by filtration. This solution was found to have a hydrogen fluoride concentration less than the minimum limit (10 ppm) of determination.

EXAMPLE 8

At first, 304 g (2 moles) of $LiPF_6$ was dissolved into a propylene carbonate containing 30 ppm of water, in a glove box adjusted to have a dew point of −60° C., to prepare 1,000 ml of an electrolytic solution. This solution was found to have acid impurities of 130 ppm HF and 50 ppm $HPO_2F_2$ by analyses with titration and ion chromatography. Then, 1.0 g of lithium chloride was added to the electrolytic solution, followed by stirring for 12 hr at room temperature. Then, the electrolytic solution was degassed at 60° C. under a pressure of 10 torr for 7 hr. Then, a precipitate of lithium fluoride formed by the reactiosn of LiCl with HF and $HPO_2F_2$ was separated from the electrolytic solution by filtration. This solution was found to have an acid impurities concentration less than the minimum limit (10 ppm) of determination.

EXAMPLE 9

At first, 152 g (1 mol) of $LiPF_6$ was dissolved into dimethyl carbonate, in a glove box adjusted to have a dew point of −60° C., to prepare 1,000 ml of an electrolytic solution. This solution was found to have 90 ppm of HF (acid impurity) by an analysis with titration. Then, this solution was introduced into a column that has an axial length of 60 cm and is charged with lithium chloride particles, at a flow rate of 10 ml/min. The thus treated solution was put into a PTFE vessel equipped with a nozzle for bubbling nitrogen gas thereinto, and then nitrogen gas was bubbled into the solution at 40° C. for 5 hr. The thus obtained solution was found to have an acid impurities concentration less than the minimum limit (10 ppm) of determination.

EXAMPLE 10

At first, 94 g (1 mol) of lithium tetrafluoroborate ($LiBF_4$) was dissolved into diethyl carbonate, in a glove box adjusted to have a dew point of −60° C., to prepare 1,000 ml of an electrolytic solution. This solution was found to have 110 ppm of HF by an analysis with titration. Then, 1.1 g of acetyl chloride was added to the solution, followed by stirring for 12 hr at room temperature. Then, this solution was put into a PTFE vessel equipped with a nozzle for bubbling nitrogen gas thereinto, and then nitrogen gas was bubbled into the solution at 70° C. for 4 hr, thereby to purge HCl and an excess amount of acetyl chloride. The thus obtained solution was found to have a HF concentration less than the minimum limit (10 ppm) of determination.

EXAMPLE 11

At first, 152 g (1 mol) of $LiPF_6$ was dissolved into diethyl carbonate, in a glove box adjusted to have a dew point of −60° C., to prepare 1,000 ml of an electrolytic solution. This solution was found to have 100 ppm of acid impurities on a basis of HF, by an analysis with titration. Then, 0.4 g of phosphorus trichloride was added to the solution, followed by stirring for 12 hr at room temperature. Then, this solution was put into a PTFE vessel equipped with a nozzle for bubbling nitrogen gas thereinto, and then nitrogen gas was bubbled into the solution at 70° C. for 4 hr, thereby to purge HCl and an excess amount of phosphorus trichloride. The thus obtained solution was found to have an acid impurities concentration less than the minimum limit (10 ppm) of determination.

EXAMPLE 12

At first, 152 g (1 mol) of $LiPF_6$ was dissolved into propylene carbonate, in a glove box adjusted to have a dew point of −60° C., to prepare 1,000 ml of an electrolytic solution. This solution was found to have 100 ppm of acid impurities on a basis of HF, by an analysis with titration. Then, 2.0 g of calcium chloride was added to the solution, followed by stirring for 12 hr at room temperature. Then, this solution was put into a PTFE vessel equipped with a nozzle for bubbling nitrogen gas thereinto, and then nitrogen gas was bubbled into the solution at 70° C. for 4 hr, thereby to purge HCl. Then, an excess amount of calcium chloride and a precipitate of calcium fluoride formed by the reaction of calcium chloride with acid impurities were separated from the solution. The thus obtained solution was found to have an acid impurities concentration less than the minimum limit (10 ppm) of determination.

EXAMPLE 13

At first, 304 g (2 moles) of $LiPF_6$ was dissolved into propylene carbonate, in a glove box adjusted to have a dew point of −60° C., to prepare 1,000 ml of an electrolytic solution. This solution was adjusted to have a HF concentration of 2 wt %, by adding HF thereto. Then, 70 g of lithium chloride was added to the solution, followed by stirring for 12 hr at room temperature. Then, this solution was degassed at 60° C. for 7 hr under a pressure of 10 torr. Then, a precipitate of lithium fluoride formed by the reaction of lithium chloride with HF was separated from the solution. The thus obtained solution was found to have an acid impurities concentration less than the minimum limit (10 ppm) of determination.

COMPARATIVE EXAMPLE 5

In this example, an at least one hydrogen-free halide of the second method was omitted, as follows.

At first, 152 g (1 mol) of $LiPF_6$ was dissolved into a solvent mixture of 1 part by volume of diethyl carbonate and 1 part by volume of ethylene carbonate, in a glove box adjusted to have a dew point of −60° C., to prepare 1,000 ml of an electrolytic solution. This solution was found to have 70 ppm of HF and 30 ppm of $HPO_2F_2$ by an analysis with titration. Then, the electrolytic solution was put into a PTFE vessel equipped with a nozzle for bubbling nitrogen gas thereinto, and then nitrogen gas was bubbled into the solution at 50° C. for 4 hr. The sampled waste gas emitted from the solution was found to contain an impurity of only diethyl carbonate and not to contain hydrogen fluoride, by an analysis with infrared spectrometer. Then, diethyl carbonate in an amount comparable to that of the same lost in the nitrogen gas bubbling was added to the electrolytic solution. Then, this solution was analyzed again to determine the HF and $HPO_2F_2$ concentrations. These concentrations were respectively 70 ppm and 30 ppm, which are the same as those before the nitrogen gas bubbling. This means that it was impossible to separate HF from the solution, using the vapor pressure difference. The ionic conductivity of the thus obtained electrolytic solution containing $LiPF_6$ (its concentration is 1 mol/liter) dissolved in a solvent mixture of 1 part by volume of diethyl carbonate and 1 part by volume of ethylene carbonate was measured at 25° C. using an alternating current double-pole type conductometer. The result of this measurement was 7.8 mS/cm.

A test cell was prepared in a manner that is the same as that of Example 3, except in that the above-prepared electrolytic soution of this example was used in place of that of Example 3. The thus prepared test cell was subjected to the same charge-and-discharge test as that of Example 6. The results of this test were also satisfactory, as is the same as those of Example 3. This test cell was subjected to the same accelerated deterioration test as that of Example 6. After the deterioration test, the above charge-and-discharge test was conducted again in the same manner as that of Example 6. By this test, it was found that the initial discharge capacity of 100% decreased to about 88%. After this test, it was found by the obseration that this solution, which had been colorless, turned yellow.

What is claimed is:

1. A method for purifying an electrolytic solution used for a lithium cell, the electrolytic solution containing an acid impurity having at least one hydrogen atom in the molecule, the method comprising the steps of:

(a) adding at least one hydrogen-free halide selected from the group consisting of chlorides, bromides and iodides, to the electrolytic solution, such that the acid impurity is reacted with said at least one hydrogen-free halide, thereby to form at least one hydrogen halide selected from the group consisting of hydrogen chloride, hydrogen bromide and hydrogen iodide; and (b) purging said at least one hdyrogen halide form the electrolytic solution to purify the electrolytic solution.

2. A method according to claim 1, wherein said chlorides are $LiCl$, $NaCl$, $CaCl_2$, $MgCl_2$, $KCl$, $SiCl_4$, $BCl_3$, $PCl_3$, $PCl_5$, $POCl_8$, $PF_aCl_2$, $SCl_4$, acetyl chloride, oxalyl chloride, and phosgene.

3. A method according to claim 1, wherein said bromides are $LiBr$, $NaBr$, $CaBr_2$, $MgBr_2$, and $KBr$.

4. A method according to claim 1, wherein said iodides are $LiI$, $NaI$, $CaI_2$, $MgI_2$, and $KI$.

5. A method according to claim 1, wherein said at least one hydrogen-free halide is selected from the group consisting of lithium chloride, lithium bromide, and lithium iodide.

6. A method according to claim 1, wherein said at least one hydrogen-free halide has a boiling point not higher than 150° C.

7. A method according to claim 1, wherein said at least one hydrogen-free halide is at least one chloride.

8. A method according to claim 1, wherein said at least one hydrogen-free halide is in at least one amount equimolar with said acid impurity.

9. A method according to claim 1, wherein said step (b) is conducted by distilling off said at least one hydrogen halide from the electrolytic solution, under reduced pressure.

10. A method according to claim 1, wherein said step (b) is conducted by bubbling an inert gas into the electrolytic solution.

11. A method according to claim 1, wherein said step (b) is conducted at a temperature of from 0 to 150° C.

12. A method according to claim 1, wherein said acid impurity is at least one compound selected from the group consisting of $HPF_6$, $HBF_4$, $HSbF_6$, $HAsF_6$, $HCF_aSO_3$, $HN(CF_3SO_2)_2$, $HClO_4$, $HF$, $HPO_2F_2$, $HBOF_2$, $HSbO_2F_2$, $H_2PO_3F$, and $H_2SO_4$.

13. A method according to claim 12, wherein said acid impurity is said HF.

* * * * *